(12) United States Patent
Kabeya

(10) Patent No.: US 8,649,027 B2
(45) Date of Patent: Feb. 11, 2014

(54) MULTIFUNCTION APPARATUS AND NON-TRANSITORY COMPUTER READABLE MEDIUM WITH A DISPLAY PROGRAM RECORDED THEREON FOR MULTIFUNCTION APPARATUS

(75) Inventor: Shozo Kabeya, Gamagori (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1876 days.

(21) Appl. No.: 11/477,426

(22) Filed: Jun. 30, 2006

(65) Prior Publication Data

US 2007/0002361 A1  Jan. 4, 2007

(30) Foreign Application Priority Data

Jul. 1, 2005 (JP) ................................. 2005-193973

(51) Int. Cl.
*G06K 15/00* (2006.01)
(52) U.S. Cl.
USPC ........... 358/1.13; 358/296; 358/500; 358/401
(58) Field of Classification Search
USPC ..................... 358/1.1, 452, 1.14, 296, 500
See application file for complete search history.

(56) References Cited

U.S. PATENT DOCUMENTS

2005/0286090 A1* 12/2005 Ahne et al. .................... 358/452
2007/0002361 A1*  1/2007 Kabeya ....................... 358/1.14

FOREIGN PATENT DOCUMENTS

| JP | 09-258669 | 10/1997 |
| JP | 10-190918 A | 7/1998 |
| JP | 2000-311044 | 11/2000 |
| JP | 2001-274939 | 10/2001 |
| JP | 2002-099375 A | 4/2002 |
| JP | 2003-283635 A | 10/2003 |
| JP | 2005-044108 | 2/2005 |

OTHER PUBLICATIONS

Japanese Office Action, with English translation, issued in Japanese Patent Application No. 2005-193973, mailed Nov. 30, 2010.
Japanese Notification of Reason(s) for Rejections, w/ English translation thereof, issued in Japanese Patent Application No. 2005-193973 dated Aug. 24, 2010.

* cited by examiner

*Primary Examiner* — King Poon
*Assistant Examiner* — Iriana Cruz
(74) *Attorney, Agent, or Firm* — Miles & Stockbridge P.C.

(57) ABSTRACT

A multifunction apparatus having plurality types of functions and a display device that indicates one of the functions including: a selection device that is operated so as to select a function to be used among the plurality types of functions; and a display control device that makes the display device display information regarding the function selected with the selection device in an appearance that is different from appearances for rest of the plurality types of functions.

9 Claims, 10 Drawing Sheets

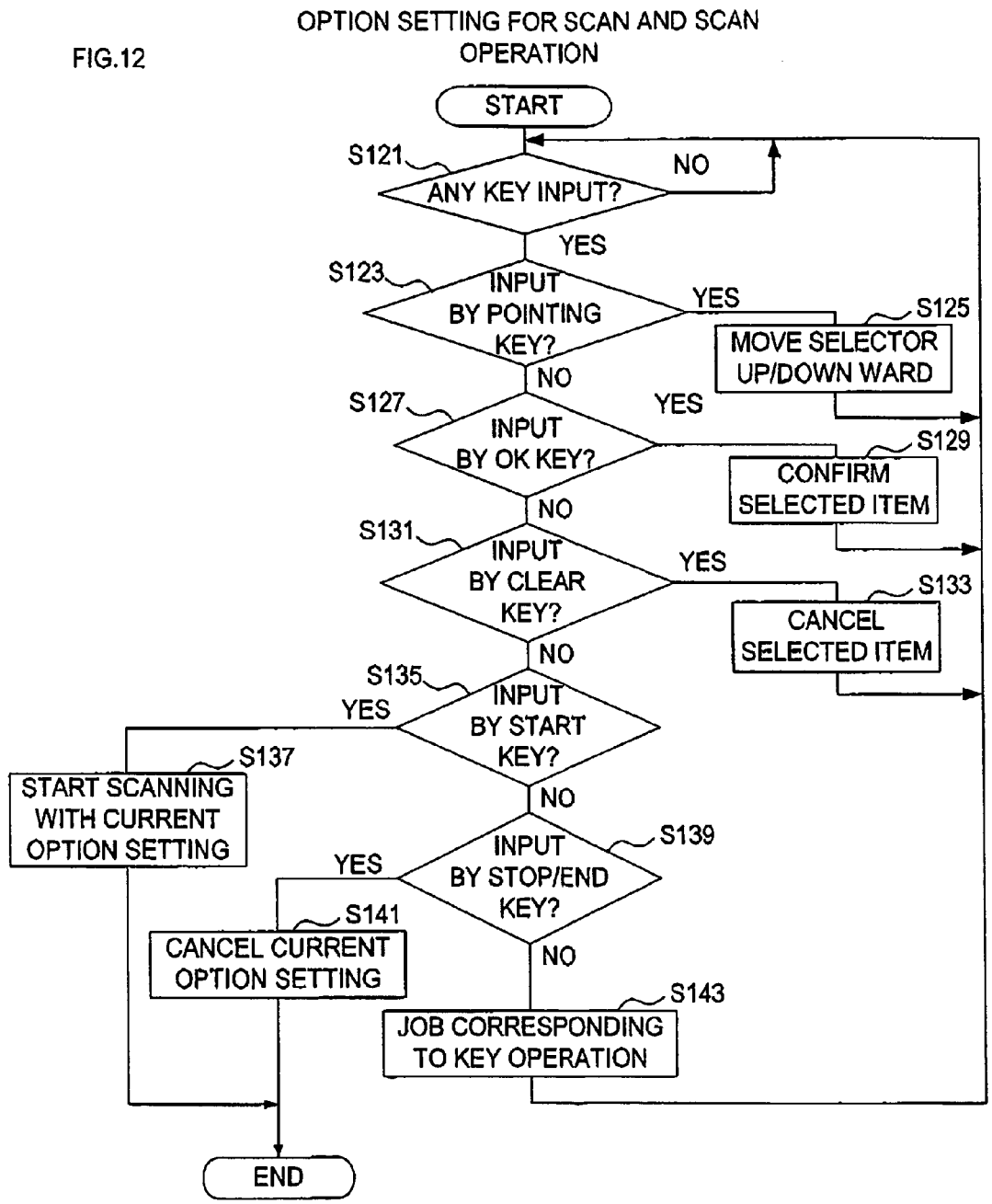

MULTIFUNCTION APPARATUS AND NON-TRANSITORY COMPUTER READABLE MEDIUM WITH A DISPLAY PROGRAM RECORDED THEREON FOR MULTIFUNCTION APPARATUS

CROSS-REFERENCE TO RELATED APPLICATIONS

This application claims the benefit of Japanese Patent Application No. 2005-193973 filed Jul. 1, 2005 in the Japan Patent Office, the disclosure of which is incorporated herein by reference.

BACKGROUND

This invention relates to a multifunction apparatus having various functions. Application of the present invention is especially effective for a multifunction apparatus having an image reading function and an image recording function.

In a multifunction apparatus having various functions, a user operates a selection device, such as a selection button, in order to select a function.

If the selected function has optional features, information on the optional features of the selected function is shown on a display device, such as a LCD. A user selects an optional feature to be used among the displayed information shown on the display device.

However, a function selected and shown in the display device or the information on the optional features related to the selected function is displayed in letters in monochrome, usually in a white or a black color.

Consequently, in this conventional multifunction apparatus, a user needs to correctly read displayed letters in order to check a selected function or information on optional features of the selected function. There has been a problem that a selected function or information on optional features cannot be instantly checked.

SUMMARY

In one aspect of the present invention, a multifunction apparatus may be preferably provided with a technique wherein displayed information can be instantly and easily checked.

A multifunction apparatus having plurality types of functions and a display device that indicates one of the functions including: a selection device that is operated so as to select a function to be used among the plurality types of functions; and a display control device that makes the display device display information regarding the function selected with the selection device in an appearance that is different from appearances for rest of the plurality types of functions.

With the above-described invention, information on a selected function of the multifunction apparatus and information related to the selected function are displayed in a manner different among each of the functions of the multifunction apparatus. Therefore, a selected function and related information can be instantly and easily checked.

BRIEF DESCRIPTION OF THE DRAWINGS

The invention will now be described below, by way of example, with reference to the accompanying drawings, in which:

FIG. 12 is a flowchart explaining a control flow when the image reading function is selected.

DETAILED DESCRIPTION OF THE PREFERRED EMBODIMENT

In the present embodiment, the present invention can be applied to a multifunction apparatus, which may include a facsimile function; an image reading function (scanning function); a copy function (a copy print function); a photo print function (digital photo print function), wherein printing is performed so as to provide an image quality equivalent to a quality of a photograph; and a printer function. It is contemplated that the present invention can be used in similar type devices or processes.

[1. Schematic Structure of Multifunction Apparatus]

Figure 2:
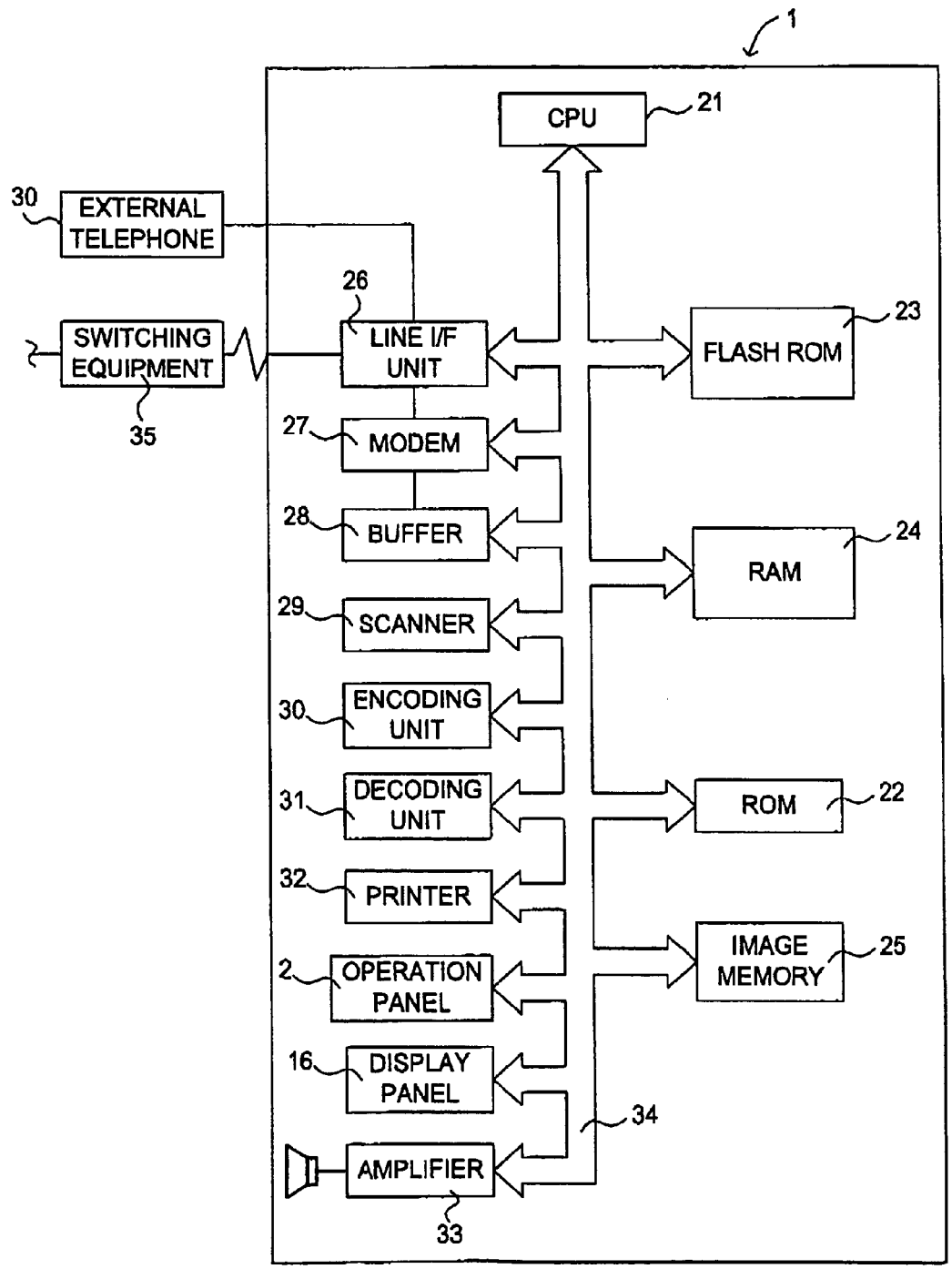
FIG. 2 is a block diagram showing an electrical structure of the multifunction apparatus.

Referring to FIG. 2, a multifunction apparatus 1 is provided with a CPU (Central Processing unit) 21, a ROM (Read Only Memory) 22, a Flash ROM (Flash Read Only Memory) 23, a RAM (Random Access Memory) 24, an image memory 25, a line I/F (Interface) unit 26, a modem 27, a buffer 28, a scanner 29, a control circuit having an encoding unit 30 and a decoding unit 31, a printer 32, an operation panel 2, a display panel 16, and an amplifier 33. These components of the multifunction apparatus 1 are connected to one another via a busline 34.

Figure 1:
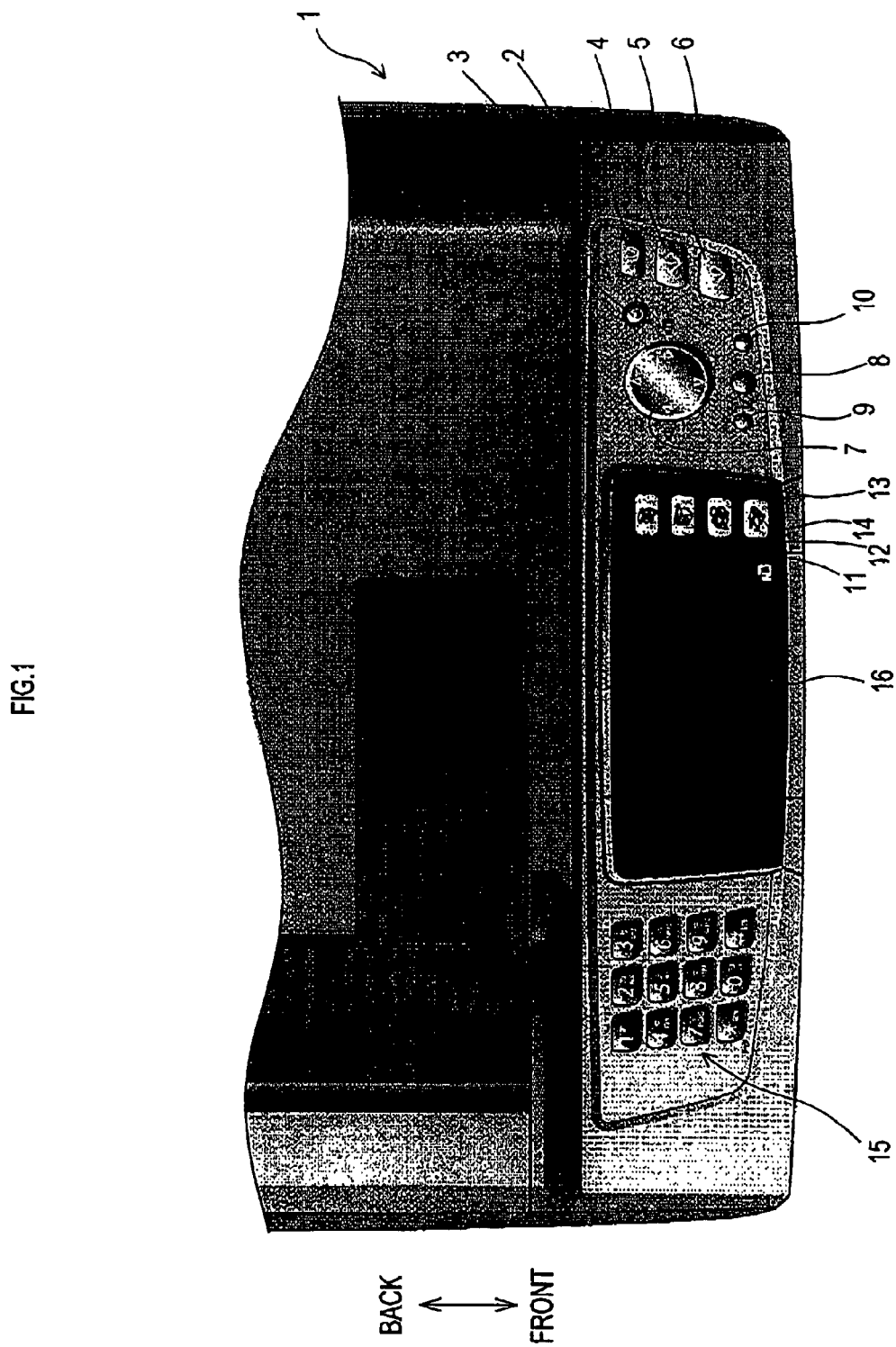
FIG. 1 is a top view showing a multifunction apparatus according to an embodiment of the present invention.

The operation panel 2, as shown in FIG. 1, may be disposed in the front end side of the upper surface of the multifunction apparatus 1. The operation panel 2 is provided with an electric power switch 3 for the multifunction apparatus 1, input switches including function selection keys 11-14 and numeric keys 15, and a display panel 16.

In the present embodiment, the display panel 16 is constituted with a color display device made with a liquid crystal display device or the like. The display panel 16 displays various information for a user in the form of letters or images corresponding to a command signal from the CPU 21 based on a user's operation on the input switches, such as the function selection keys 11-14 or the numeric keys 15.

The operation panel 2 is furthermore provided with a stop/end switch 4, a color operation start switch 5, and a monochrome operation start switch 6. The stop/end switch 4 is operated for a mandatory termination of an operation currently being performed (such as a copy operation). The color operation start switch 5 is operated so as to execute a copy operation or an image reading operation in color. The monochrome operation start switch 6 is operated so as to execute a copy operation or an image reading operation in monochrome (black and white).

The operation panel 2 is still further provided with a pointing key 7, an OK key 8, a clear key 9, and a menu key 10. The pointing key 7 is operated so as to select (focus on) an information item being displayed on the display panel 16. The OK key 8 is operated so as to confirm the item selected with the pointing key 7. The clear key 9 is operated so as to cancel the item confirmed with the OK key 8. The menu key 10 is operated so as to display various setting items for operation of the multifunction apparatus 1 on the display panel 16.

The function selection key 11 (to be referred to as a digital photo print key 11) is operated so as to select the photo print function. The selection key 12 (to be referred to as a copy key 12) is operated so as to select the copy print function. The selection key 13 (to be referred to as a facsimile key 13) is operated so as to select the facsimile function. The selection key 14 (to be referred to as a scan key 14) is operated so as to select the image reading function.

The line I/F unit 26 shown in FIG. 2 is used so as to conduct line control. The line I/F unit 26 receives various signals, such as a ringing signal sent from a switching equipment 35 or a signal indicating a telephone number of a caller (caller number). Moreover, when transmission is performed, the line I/F unit 26 transmits a dial signal to the switching equipment 35 corresponding an operation with the numeric keys 15.

Additionally, the line I/F unit 26 is provided with a terminal for an external telephone (not shown) so as to permit a connection with an external telephone 30. The multifunction apparatus 1 and the external telephone 30 are connected with a telephone line via the line I/F unit 26.

The CPU 21 controls individual components, connected via the busline 34, corresponding to various signals sent/received via the line I/F unit 26, and executes the facsimile function, the image reading function and so on. The ROM 22 stores control programs executed in the multifunction apparatus 1, which are shown in the flowcharts in FIGS. 8 to 12.

The Flash ROM 23 is a rewritable nonvolatile memory device wherein written (stored) data is maintained even after the electric power of the multifunction apparatus 1 is turned off. Then RAM 24 is a memory device wherein sequential writing/reading of stored data is possible. The RAM 24 temporarily stores various data when each operation is performed in the multifunction apparatus 1.

The image memory 25 is a memory device so as to store communication history, image data including a bit image for printing or image data read by the scanner 29. The image memory 25 may include a dynamic RAM (DRAM) which is inexpensive and has a large capacity. When image data is received, the data is temporarily stored in the image memory 25. After printing is performed by the printer 32 based on the image data, the data is erased from the image memory 25.

The modem 27 modulates, demodulates and transmits image information and communication data. Moreover, the modem 27 sends and receives various procedural signals for transmission control. The buffer 28 temporarily stores data including encoded image information received from, or to be sent to a device on another end of a line.

The scanner 29 reads an original image, inserted through an original image insertion opening (not shown), as image data. The encoding unit 30 encodes image data read by the scanner 29. The decoding unit 31 reads out image data stored in the buffer 28 or the image memory 25, and decodes the image data. The data decoded by the decoding unit 31 is printed on a recording paper by the printer 82.

The printer 32 according to the present embodiment is a known inkjet printer having a recording paper conveyance motor, a carriage motor, and a printing head and so on. The recording paper conveyance motor conveys recording paper. The carriage motor moves a carriage carrying the printing head. The printing head ejects ink onto recording paper.

The amplifier 38 outputs calling sound or voice via a speaker connected thereto.

[2. Operation of Multifunction Apparatus 1 According to Present Embodiment]

In the multifunction apparatus 1 according to the present embodiment, when one of the selection keys 11-14, such as the digital photo print key 11, is operated so as to select one of the functions, the selected function and information related to optional features provided for the selected function are shown on the display panel 16 in a specific color which is different from the colors used when other functions are selected.

When none of the selection keys 11-14 is operated, or a selected function is not executed after one of the selection keys 11-14 is operated due to the OK key 8 or the color operation start switch 6 not being operated within a predetermined period (for example, within 30 seconds in the present embodiment), a standard image is shown on the display panel 16.

Figure 3:
FIG. 3 is an explanatory view showing an example of a standard image shown on a display panel of the multifunction apparatus.

In the present embodiment, current date and time are shown in the standard image as shown in FIG. 3. However, this standard image can be changed by a user's setting operation.

Figure 4:
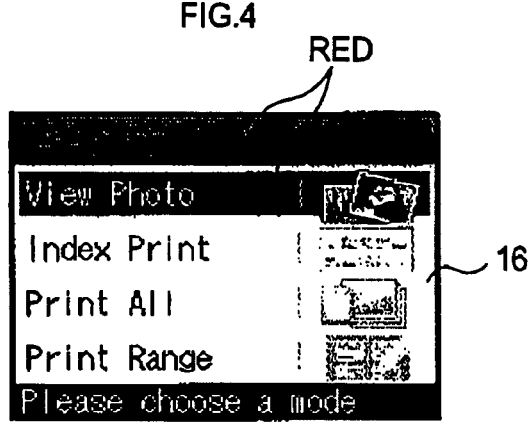
FIG. 4 is an explanatory view showing an example of display when a photo print function of the multifunction apparatus is selected.
Figure 5:
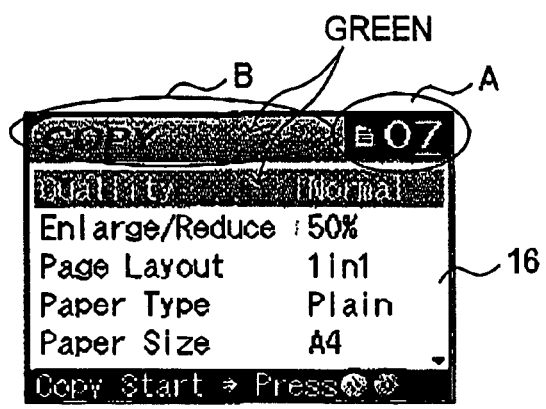
FIG. 5 is an explanatory view showing an example of display when a copy print function is selected.

When one of the selection keys 11-14 is operated, the selected function and the optional features of the selected function are displayed with a specific prevailing color which represents the selected function. Specifically, when the digital photo print key 11 is operated, as shown in FIG. 4, an indication that the photo print function is selected and the optional features of the photo print function are shown in color, wherein red is the prevailing color, on the display panel 16. When the copy key 12 is operated, as shown in FIG. 5, an indication that the copy function is selected and the optional features of the copy function are shown in color, wherein green is the prevailing color, on the display panel 16.

Figure 6:
FIG. 6 is an explanatory view showing an example of display when a facsimile function is selected.
Figure 7:
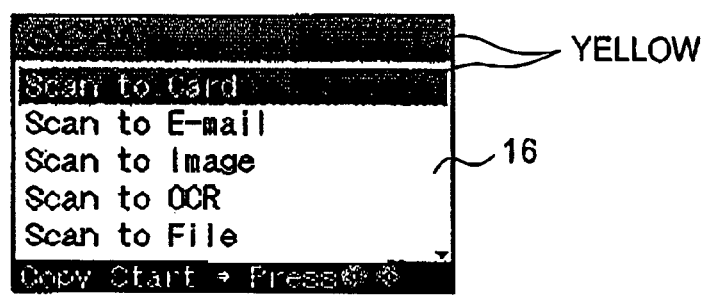
FIG. 7 is an explanatory view showing an example of display when an image reading function is selected.
Figure 8:
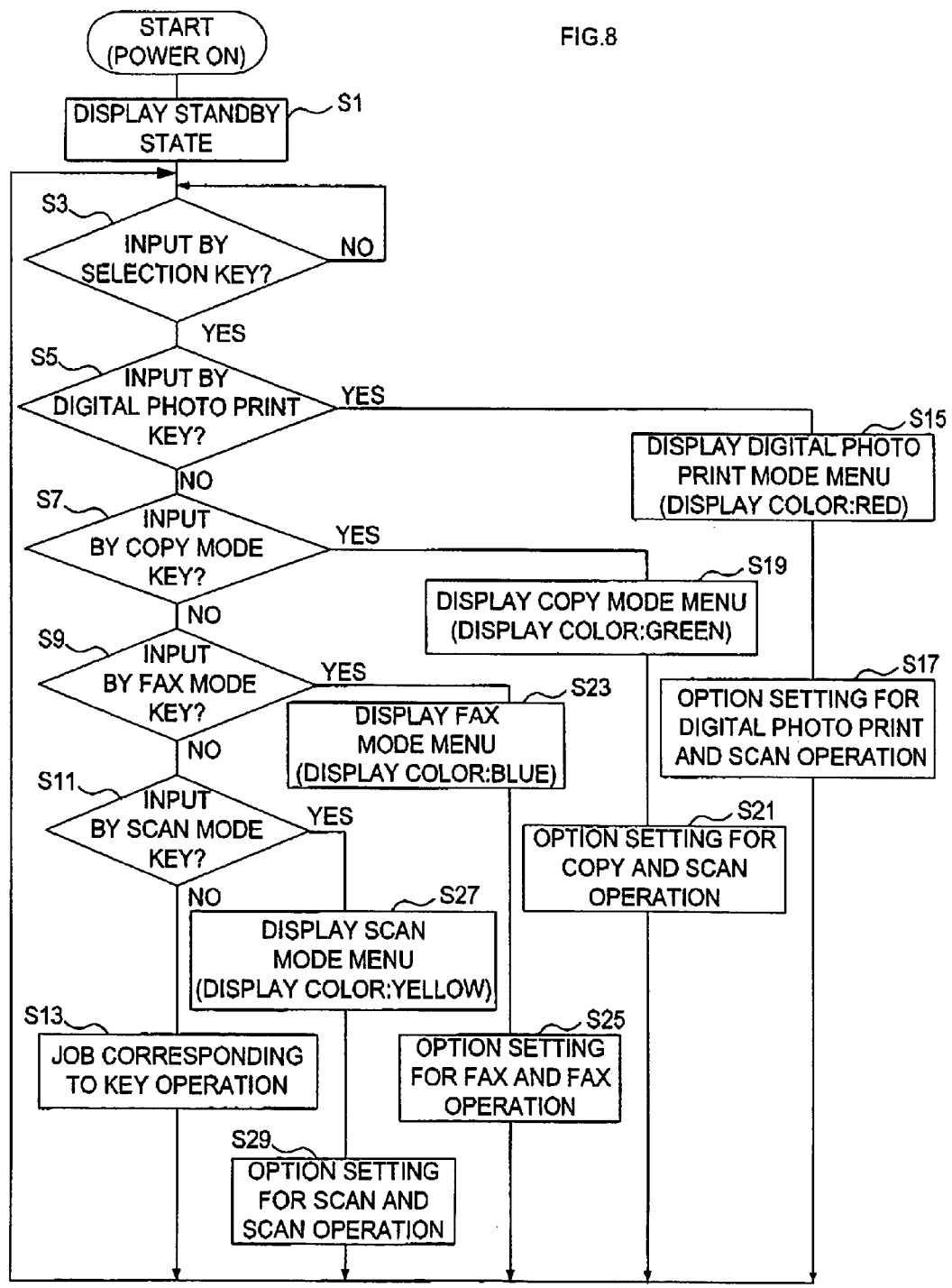
FIG. 8 is a flowchart explaining a main control flow for controlling the display panel of the multifunction apparatus according to the embodiment of the present invention.

When the facsimile key 13 is operated, as shown in FIG. 6, an indication that the facsimile function is selected and the optional features of the facsimile function are shown in color, wherein blue is the prevailing color, on the display panel 16. Furthermore, when the scan key 14 is operated, as shown in FIG. 7, an indication that the image reading function is selected and the optional features of the image reading function are shown in color, wherein yellow is the prevailing color, on the display panel 16.

When the copy key 12 or the facsimile key 13 is operated, in addition to the display of an indication and the optional features of a selected function with a specific prevailing color representing the selected function, information directly inputted by a user with the numeric keys 15 is also displayed. Such information inputted by a user is displayed in an inputted information display section A, as shown in FIGS. 5 and 6, whereas an indication of a selected function is shown in a function display section B. Information shown in the inputted information display section A is displayed in a different color from the color used in the function display section B.

Specifically, when the copy key 12 is operated so as to select the copy print function, an indication that the copy print function is selected is shown in the function display section B in color wherein a green color is the prevailing color. If the numeric keys 15 are operated so as to specify a number of print copies while this display is shown, a number is shown in black-and-white in the inputted information display section A corresponding to the operation with the numeric keys 15.

When the facsimile key 13 is operated so as to select the facsimile function, an indication that the facsimile function is selected is shown in the function display section B in color wherein blue is the prevailing color. If the numeric keys 15 are operated so as to input a destination number (facsimile number) while this display is shown, the destination number is shown in black-and-white in the inputted information display section A corresponding to the operation with the numeric keys 15.

The following explains a control flow of the above-described distinctive operation according to the present embodiment with reference to FIGS. 8-12.

[2.1 Main Control Flow (See FIG. 8)]

When the power switch 3 is turned on, the main control flow (FIG. 8) is initiated. In S1, the standard image (see FIG. 3) is shown on the display panel 16 so as to indicate that the multifunction apparatus 1 is in standby for a user's input.

In S3 it is determined whether or not any of the selection keys 11-14 or the pointing key 7 has been operated. If it is determined that one of the keys has been operated (S3: YES), in S5 to S11 it is determined which key has been operated. On the other hand, if it is determined that none of the selection keys 11-14 or the pointing key 7 has been operated (S3: NO), in S3 it is determined again whether or not any of the keys has been operated.

If it is determined that none of the selection keys 11-14 has been operated, that is, it is determined NO in all the determination steps in S5 to S11, then in S13 a job is executed corresponding to an operated key. Then, the process goes back to S1.

In S5, if it is determined that the digital photo print key 11 has been operated (S5: YES), in S15 an indication that the photo print function (the digital photo print function) is selected and the optional features of the photo print function are shown in color, wherein red is the prevailing color, on the display panel 16. In S17, when some of the optional features of the photo print function are selected and the photo print function is executed, the process goes back to S1, wherein the multifunction apparatus 1 is in the standby state. Details on the process in S17 will be described later.

In S7 if it is determined that the copy key 12 has been operated (S7: YES), in S19 an indication that the copy print function is selected and the optional features of the copy print function are shown in color, wherein green is the prevailing color, on the display panel 16. In S21, when some of the optional features of the copy print function are selected and the copy print function is executed, the process goes back to S1, wherein the multifunction apparatus 1 is in the standby state. Details on the process in S21 will be described later.

In S9 if it is determined that the facsimile key 13 has been operated (S9: YES), in S23 an indication that the facsimile function is selected and the optional features of the facsimile function are shown in color, wherein blue is the prevailing color, on the display panel 16. In S25 when some of the optional features of the facsimile function are selected and the facsimile function is executed, the process goes back to S1, wherein the multifunction apparatus 1 is in the standby state. Details on the process in S25 will be described later.

In S11 if it is determined that the scan key 14 has been operated (S11: YES), in S27 an indication that the image reading function is selected and the optional features of the image reading function are shown in color, wherein yellow is the prevailing color, on the display panel 16. In S29 when some of the optional features of the image reading function are selected and the image reading function is executed, the process goes back to S1, wherein the multifunction apparatus 1 is in the standby state. Details on the process in S29 will be described later.

[2.2 Photo Print Function (Digital Photo Print Function)]

Figure 9:
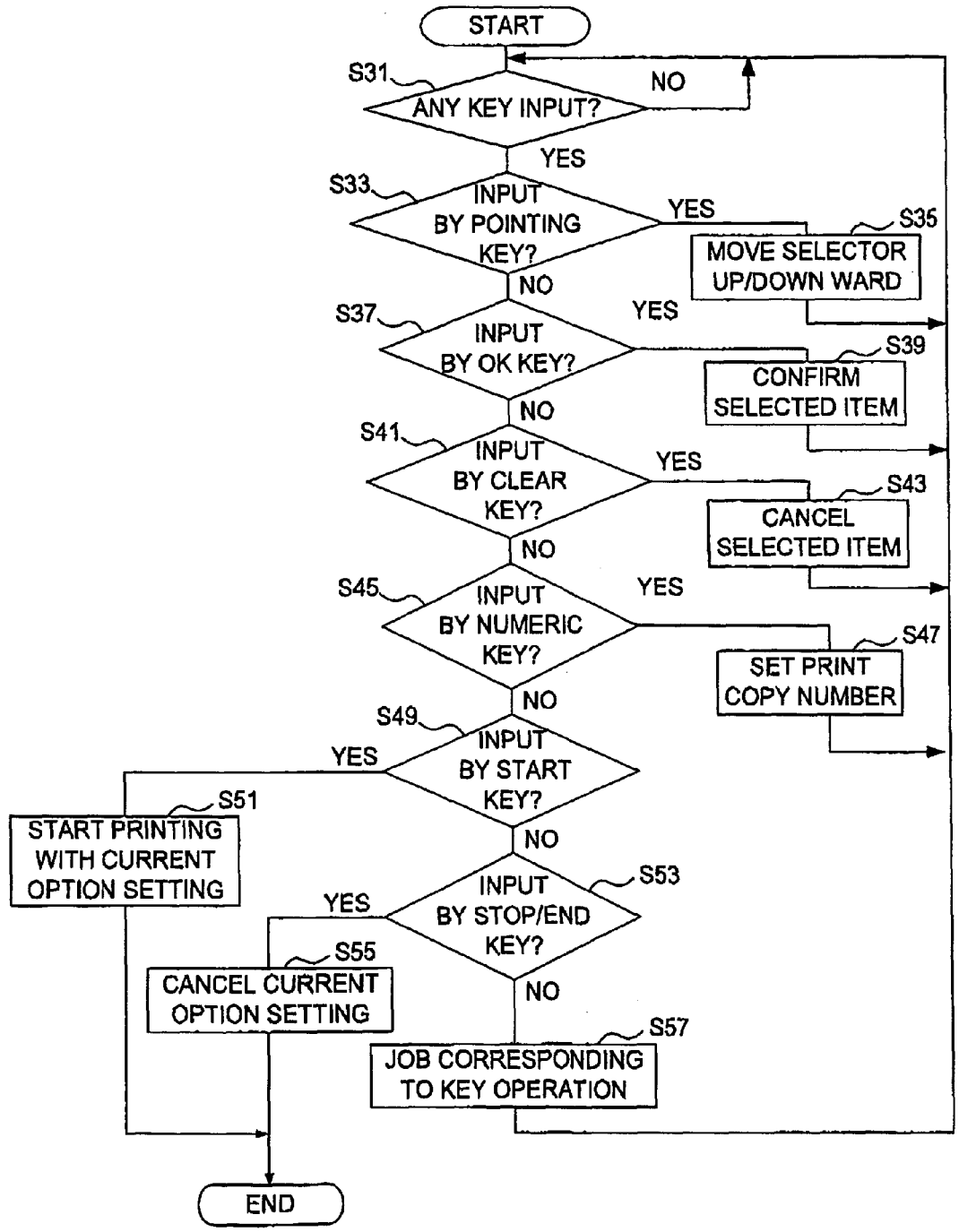
FIG. 9 is a flowchart explaining a control flow when the photo print function is selected.

When the photo print function is selected (S5: YES), S17 in the control flow, shown in FIG. 9, is initiated. Firstly, in S31 it is determined whether or not either of the pointing key 7 or the OK key 8 has been operated. If it is determined that one of the pointing key 7 or the OK key 8 has been operated (S31: YES), in S33 it is determined that whether or not the pointing key 7 has been operated.

If it is determined that the pointing key 7 has been operated (S33: YES), in S35 a selector which highlights (focuses on) a selected optional feature is moved, for example in a up-and-down direction, corresponding to the number of operation (operation amount) on the pointing key 7. Subsequently, the process goes back to S31.

On the other hand, if it is determined that the pointing key 7 has not been operated (S33: NO), in S37 it is determined whether or not the OK key 8 has been operated. If it is determined that the OK key 8 has been operated (S37: YES), in S39 an optional feature selected with the pointing key 7 is confirmed. Subsequently, the process goes back to S31.

If it is determined that the OK key 8 has not been operated (S37: NO), in S41 it is determined whether or not the clear key 9 has been operated. If it is determined that the clear key 9 has been operated (S41: YES), in S48 the optional feature selected with the pointing key 7 is canceled. Subsequently, the process goes back to S31.

On the other hand, if it is determined that the clear key 9 has not been operated (S41: NO), in S45 it is determined whether or not the numeric keys 15 have been operated. If it is determined that the numeric keys 15 have been operated (S45: YES), in S47 the number inputted with the numeric keys 15 is set as a number of print copies and shown in the inputted information display section A. Subsequently, the process goes back to S31.

In FIG. 4, the inputted information display section A is not shown. This state of display shows a case wherein no information has been inputted with the numeric keys 15. In a case wherein a number of print copies is not set with the numeric keys 15, the inputted information display section A is not shown, and the number of print copies is automatically set one.

If it is determined that the numeric keys 15 have not been operated (S45: NO), in S49 it is determined whether or not one of the color operation start switch 5 or the monochrome operation start switch 6 has been operated. If it is determined that one of the color operation start switch 5 or the monochrome operation start switch 6 has been operated (S49: YES), in S51 the photo print function is executed in accordance with an optional feature setting currently set. Then, the present control is ended.

In the present embodiment, when the photo print function is executed, photo printing is performed in color irrespective of whichever switch being operated between the color operation start switch 5 and the monochrome operation start switch 6.

On the other hand, if it is determined that neither of the color operation start switch 5 nor the monochrome operation start switch 6 has been operated (S49: NO), in S53 it is determined whether or not the stop/end switch 4 has been operated. If it is determined that the stop/end switch 4 has been operated (S53: YES), in S55 the optional feature setting currently set is canceled. Then, the present control is ended.

In S53 if it is determined that the stop/end switch 4 has not been operated (S53: NO), in S57 a job is executed corresponding to an operated key. Then, the present control is ended.

[2.3 Copy Print Function]

Figure 10:
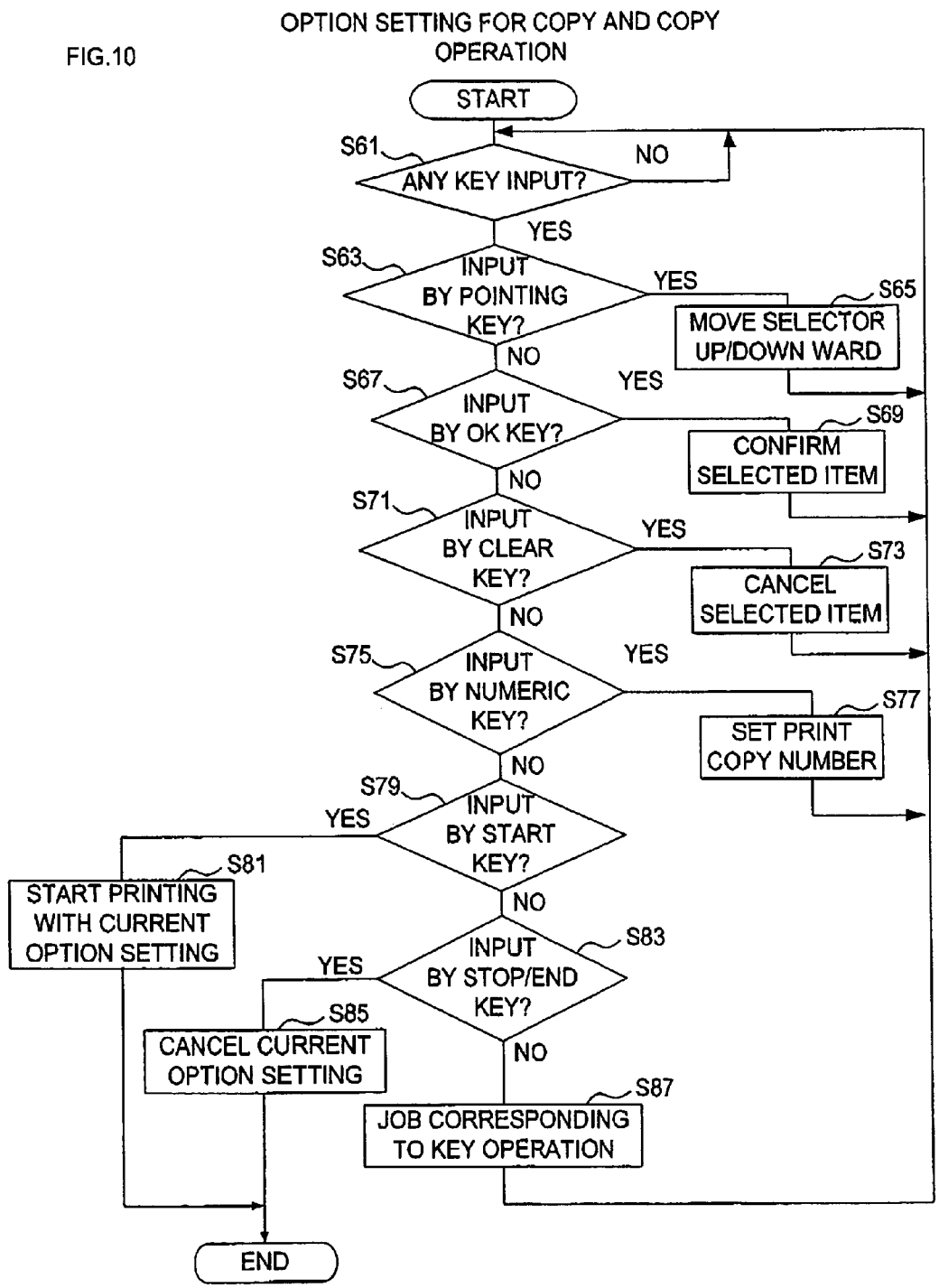
FIG. 10 is a flowchart explaining a control flow when the copy print function is selected.

In S7 when the copy print function is selected (S7: YES), in S21 the control flow shown in FIG. 10 is initiated. Firstly, in S61 it is determined whether or not either of the pointing key 7 or the OK key 8 has been operated. If it is determined that one of the pointing key 7 or the OK key 8 has been operated (S61: YES), in S63 it is determined whether or not the pointing key 7 has been operated.

If it is determined that the pointing key 7 has been operated (S63: YES), in S65 a selector which highlights (focuses on) a selected optional feature is moved, for example in a up-and-down direction corresponding to the number of operation (operation amount) on the pointing key 7. Subsequently, the process goes back to S61.

On the other hand, if it is determined that the pointing key 7 has not been operated (63: NO), in S67 it is determined that the OK key 8 has been operated. If it is determined that the OK key 8 has been operated (S67: YES), in S69 the optional feature selected by the pointing key 7 is confirmed. Subsequently, the process goes back to S61.

If it is determined that the OK key 8 has not been operated (S67: NO), in S71 it is determined whether or not the clear key 9 has been operated. If it is determined that the clear key 9 has been operated (S71: YES), in S73 the optional feature selected with the pointing key 7 is canceled. Subsequently, the process goes back to S61.

On the other hand, if it is determined that the clear key 9 has not been operated (S71: NO), in S75 it is determined whether or not the numeric keys 15 have been operated. If it is determined that the numeric keys 15 have been operated, in S77 the number inputted with the numeric keys 15 is set as the number of print copies, and shown in the inputted information display section A. Subsequently, the process goes back to S61.

If it is determined that the numeric keys 15 have not been operated (S75: NO), in S79 it is determined whether or not any of the color operation start switch 5 or the monochrome operation start switch 6 has been operated. If it is determined that one of the color operation start switch 5 or the monochrome operation start switch 6 has been operated (S79: YES), in S81 the copy print function is executed in accordance with the optional feature setting currently set. Then, the present control is ended.

On the other hand, if it is determined that neither of the color operation start switch 5 nor the monochrome operation start switch 6 has been operated (S79: NO), in S83 it is determined whether or not the stop/end switch 4 has been operated. If it is determined that the stop/end switch 4 has been operated (S83: YES), in S85 the optional feature setting currently set is canceled. Then, the present control is ended.

If it is determined that the stop/end switch 4 has not been operated (S83: NO), in S87 a job is executed corresponding to an operated key. Then, the present control is ended.

[2.4 Facsimile Print Function]

Figure 11:
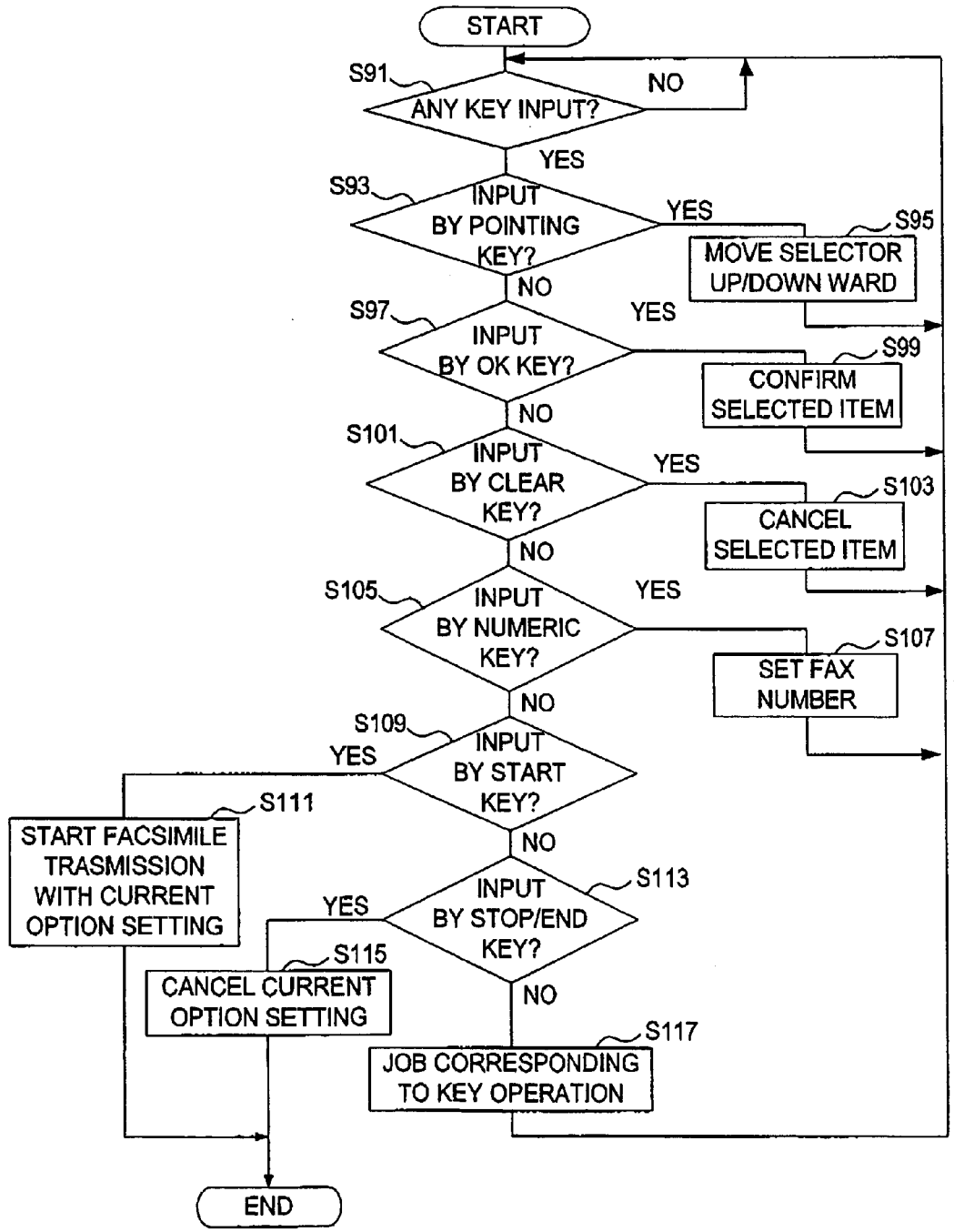
FIG. 11 is a flowchart explaining a control flow when the facsimile function is selected.
Figure 13A:
FIGS. 13A, 13B, 13C, and 13D are explanatory views each showing another example of display when the photo print function, the copy print function, the facsimile function, and the image reading function are respectively selected.
Figure 13B:
Figure 13C:
Figure 13D:

When the facsimile function is selected (S9: YES), in S25 the control flow shown in FIG. 11 is initiated. Firstly, in S91 it is determined whether or not either of the pointing key 7 or the OK key 8 has been operated. If it is determined that one of the pointing key 7 or the OK key 8 has been operated (S91: YES), in S93 it is determined whether or not the pointing key 7 has been operated.

If it is determined that the pointing key 7 has been operated (S93: YES), in S95 a selector which highlights (focuses on) a selected optional feature is moved, for example in a up-and-down direction corresponding to the number of operation (operation amount) on the pointing key 7. Subsequently, the process goes back to S91.

On the other hand, if it is determined that the pointing key 7 has not been operated (S93: NO), in S97 it is determined whether or not the OK key 8 has been operated. If it is determined that the OK key 8 has been operated (S97: YES), in S99 an optional feature selected with the pointing key 7 is confirmed. Subsequently, the process goes back to S91.

If it is determined that the OK key 8 has not been operated (S97: NO), in S101 it is determined whether or not the clear key 9 has been operated. If it is determined that the clear key 9 has been operated (S101: YES), in S103 the optional feature selected with the pointing key 7 is canceled. Subsequently, the process goes back to S91.

On the other hand, if it is determined that the clear key 9 has not been operated (S101: NO), in S105 it is determined whether or not the numeric keys 15 have been operated. If it is determined that the numeric keys 15 have been operated (S105: YES), in S107 the number inputted with the numeric keys 15 is set as a destination number (facsimile number), and shown in the inputted information display section A. Subsequently, the process goes back to S91.

If it is determined that the numeric keys 15 have not been operated (S105: NO), in S109 it is determined whether or not any of the color operation start switch 5 or the monochrome operation start switch 6 has been operated. If it is determined that one of the color operation start switch 6 or the monochrome operation start switch 6 has been operated (S109: YES), in S111 the facsimile data function is executed according to the optional feature setting currently set. Then, the present control is ended.

On the other hand, if it is determined that neither of the color operation start switch 5 or the monochrome operation start switch 6 has been operated (S109: NO), in S113 it is determined whether or not the stop/end switch 4 has been operated. If it is determined that the stop/end switch 4 has been operated (S113: YES), in S115 the optional feature setting currently set is canceled. Then, the present control is ended.

If it is determined that the stop/end switch 4 has not been operated (S113: NO), in S117 a job is executed corresponding to an operated key. Then, the present control is ended.

[2.5 Image Reading Print Function]

When the image reading (scan) function is selected (S11: YES), in S29 the control flow shown in FIG. 12 is initiated. Firstly, in S121 it is determined whether or not either of the pointing key 7 or the OK key 8 has been operated. If it is determined that the one of the pointing key 7 or the OK key 8 has been operated (S121: YES), in S123 it is determined whether or not the pointing key 7 has been operated.

If is determined that the pointing key 7 has been operated (S123: YES), in S125 a selector which highlights (focuses on) a selected optional feature is moved, for example in a up-and-down direction, corresponding to the number of operation (operation amount) on the pointing key 7. Subsequently, the process goes back to S121.

On the other hand, if it is determined that the pointing key 7 has not been operated (S123: NO), in S127 it is determined whether or not the OK key 8 has been operated. If it is determined that the OK key 8 has been operated (S127: YES), in S129 the optional feature selected with the pointing key 7 is confirmed. Subsequently, the process goes back to S121.

If it is determined that the OK key 8 has not been operated (S127: NO), in S131 it is determined whether or not the clear key 9 has been operated. If it is determined that the clear key 9 has been operated (S131: YES), in S133 the optional feature selected with the pointing key 7 is cancelled. Subsequently, the process goes back to S121.

On the other hand, if it is determined that the clear key 9 has not been operated (S131: NO), in S135 it is determined whether or not either of the color operation start switch 5 or the monochrome operation start switch 6 has been operated. If it is determined that one of the color operation start switch 5 or the monochrome operation start switch 6 has been operated (S135: YES), in S137 the image reading function is executed according to the optional feature currently set. Then, the present control is ended.

On the other hand, if it is determined neither of the color operation start switch 5 nor the monochrome operation start switch 6 has been operated (S135: NO), in S139 it is determined whether or not the stop/end switch 4 has been operated. If it is determined that the stop/end switch 4 has been operated (S139: YES), in S141 the optional feature currently set is cancelled. Then, the present control is ended.

If it is determined that the stop/end switch 4 has not been operated (S139: NO), in S143 a job is executed corresponding to an operated key. Then, the present control is ended.

[3. Features of Multifunction Apparatus According to Present Embodiment]

In the multifunction apparatus 1 according to the present embodiment, when one of the selection keys 11-14 is operated, an indication that the function is selected and optional features of the selected function are shown in color wherein a specific color, which represents the function, is the prevailing color. Therefore, a selected function can be instantly and easily recognized.

Moreover, display in the inputted information display section A and the function display section B is shown in different colors. As a result, the inputted information display section A and the function display section B can be easily and reliably distinguished. Therefore, a user can even more instantly and reliably recognize information and function inputted or selected by himself/herself.

OTHER EMBODIMENTS

In the above-described embodiment, the present invention is applied to a multifunction apparatus having a facsimile function, an image reading function (scanning function), a copy function (copy print function), a photo print function (digital photo print function) wherein printing is performed so as to provide an image quality equivalent to a quality of a photograph. However, the present invention is not limited to the above-described embodiment.

In the above-described embodiment, a selected function is displayed in a specific color which is different from the colors used when other functions are selected. However, the present invention is not limited to this way of display. The way of display can be different, for example, with using a different display pattern for each of the functions.

Moreover, in the above-described embodiment, displayed information including optional features is shown in an identical color. However, the present invention is not limited to this way of display. For example, optional features can be displayed in a color equivalent to the color in the function display section B, but with different density or contrast.

Furthermore, in the above-described embodiment, the ways of display in the function display section B and the inputted information display section A are different by showing displayed information in each section in a different color. However, the present invention is not limited to this way of display. The ways of display in each section can be different by using, for example, different patterns, such as the hatching patterns shown in FIGS. 13A to 13D.

Still furthermore, in the above-described embodiment, displayed information in the function display section B and the inputted information display section A are shown in different colors. However, the present invention is not limited to this way of display.

Additionally, in the above-described embodiment, the way of display is different for each of functions selected in accordance with software. However, the present invention is not limited to this way of display. The way of display can be different for each of functions electrically selected with a hardware structure.

Moreover, in the above-described embodiment, when the photo print function is selected, display is shown in color wherein red is the prevailing color. When the copy print function is selected, display is shown in color wherein green is the prevailing color. When the facsimile function is selected, display is shown in color wherein blue is the prevailing color. When the image reading function is selected, display is shown in color wherein yellow is the prevailing color. However, the present invention is not limited to this way of display.

Moreover, in the above-described embodiment, displayed information shown on the display panel 16 is shown in a specific color assigned to each of the functions so as to represent the function. However, the present invention is not limited to this way of display. For example, the selection keys 11-14 can be also illuminated with a color equivalent to the color used so as to indicate a selected function on the display panel 16.

Although the specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

What is claimed is:

1. A multifunction apparatus having a plurality of functions and a display device that indicates one of the functions, the apparatus comprising:
   a selection device configured to select a function to be used among the plurality of functions; and
   a display control device configured to make the display device display information regarding the function selected with the selection device in an appearance that is different from appearances for rest of the plurality of functions; wherein:
   the display device comprises a function display section configured to indicate the selected function, an inputted information display section configured to display information inputted with an input device by a user, and an optional feature display section configured to display optional features, the display control device is configured to make the display device display information in the function display section and the inputted information display section in an appearance different from each other, the display control device is configured to control the display device in such a manner that information regarding the function displayed in the function display section and information regarding one of the optional features displayed in the optional feature display section are represented in a same color, and that information inputted with the input device by the user displayed in the inputted information display section is represented in a different color from the color of the information regarding the function and the information regarding the one of the optional features, and the display control device is configured to make the display device display information regarding the selected function with a specific color that is different from colors used for other functions so that information regarding each of the plurality of functions is shown in an appearance that is different from appearances for the rest of the plurality of functions.

2. The multifunction apparatus as set forth in claim 1, wherein the plurality of functions include a photo print function, which is selectable with the selection device, wherein printing of an image is performed based on photo data.

3. The multifunction apparatus as set forth in claim 1, wherein the display control device is configured to make the display device display information with a specific color respectively in the function display section and the inputted information display section, so that the displayed information is shown in different appearances.

4. A multifunction apparatus having a plurality of functions including at least an image reading function and an image print function, and a display device configured to indicate the one of the functions, the apparatus comprising:

a selection device configured to select a function to be used among the plurality of functions; and a display control device configured to make the display device display information regarding the function selected with the selection device in an appearance that is different from appearances for rest of the plurality of functions, wherein:

the display device comprises a function display section configured to indicate the selected function, an inputted information display section configured to display information inputted with an input device by a user, and an optional feature display section configured to display optional features, the display control device is configured to make the display device display information in the function display section and the inputted information display section in an appearance different from each other, the display control device is configured to control the display device in such a manner that information regarding the function displayed in the function display section and information regarding one of the optional features displayed in the optional feature display section are represented in a same color, and that information inputted with the input device by the user displayed in the inputted information display section is represented in a different color from the color of the information regarding the function and the information regarding the one of the optional features, and the display control device is configured to make the display device display information regarding the selected function with a specific color that is different from colors used for other functions so that information regarding each of the plurality of functions is shown in an appearance that is different from appearances for the rest of the plurality of functions.

5. The multifunction apparatus as set forth in claim 4, wherein the plurality of functions include a photo print function, which is selectable with the selection device, wherein printing of an image is performed based on photo data.

6. The multifunction apparatus as set forth in claim 4, wherein the display control device is configured to make the display device display information with a specific color respectively in the function display section and the inputted information display section, so that the displayed information is shown in different appearances.

7. The multifunction apparatus set forth in claim 5, wherein the display control device is configured to make the display device display information regarding the selected function with a specific color that is different from colors used for other functions so that information regarding each of the plurality of functions is shown in an appearance that is different from appearances for the rest of the plurality of functions.

8. The multifunction apparatus as set forth in claim 5, wherein the display control device is configured to make the display device display information with a specific color respectively in the function display section and the inputted information display section, so that the displayed information is shown in different appearances.

9. A non-transitory computer readable medium with a display program recorded thereon for a multifunction apparatus having plurality of functions, wherein:

the multifunction apparatus includes:

a selection device configured to select a function to be used among the plurality of functions;

an input device configured to be operated by a user; and a display device configured to operate the selected function, and the display program, when executed by the multifunction apparatus, configured to cause the multifunction apparatus to work as:

a display control device configured to control the display device so as to display information regarding the selected function in an appearance that is different from appearances for rest of the plurality of functions, a function display section configured to indicate the selected function, an optional feature display section configured to display optional features, and an inputted information display section configured to display information inputted with an input device by the user, wherein the display control device is configured to make the display device display information in the function display section and the inputted information display section in an appearance different from each other, the display control device is configured to control the display device in such a manner that information regarding the function displayed in the function display section and information regarding one of the optional features displayed in the optional feature display section are represented in a same color, and that information inputted with the input device by the user displayed in the inputted information display section is represented in a different color from the color of the information regarding the function and the information regarding the one of the optional features, and the display control device is configured to make the display device display information regarding the selected function with a specific color that is different from colors used for other functions so that information regarding each of the plurality of functions is shown in an appearance that is different from appearances for the rest of the plurality of functions.

* * * * *